(12) United States Patent
Wegner-Donnelly et al.

(10) Patent No.: US 7,554,278 B2
(45) Date of Patent: Jun. 30, 2009

(54) LOAD-LIFTING APPARATUS AND METHOD OF STORING ENERGY FOR THE SAME

(75) Inventors: Frank Wegner-Donnelly, North Vancouver (CA); Raymond Cousineau, Vancouver (CA); Serge Mai, Montreal (CA)

(73) Assignee: Railpower Technologies Corp., Brossard, Quebec (CA)

( * ) Notice: Subject to any disclaimer, the term of this patent is extended or adjusted under 35 U.S.C. 154(b) by 195 days.

(21) Appl. No.: 11/818,043

(22) Filed: Jun. 13, 2007

(65) Prior Publication Data

US 2008/0048497 A1    Feb. 28, 2008

Related U.S. Application Data

(60) Provisional application No. 60/804,614, filed on Jun. 13, 2006.

(51) Int. Cl.
*H02P 3/00* (2006.01)
(52) U.S. Cl. .................. 318/375; 318/376; 318/377; 187/277
(58) Field of Classification Search .................. None
See application file for complete search history.

(56) References Cited

U.S. PATENT DOCUMENTS

| | | | |
|---|---|---|---|
| 4,456,097 A | 6/1984 | Salihi | |
| 5,936,375 A * | 8/1999 | Enoki | 318/727 |
| 6,308,639 B1 | 10/2001 | Donelly et al. | |
| 6,441,581 B1 * | 8/2002 | King et al. | 320/101 |
| 6,688,481 B1 | 2/2004 | Adner et al. | |
| 6,732,833 B2 | 5/2004 | Rogelja | |
| 7,165,654 B2 * | 1/2007 | Takehara et al. | 187/290 |
| 7,190,133 B2 * | 3/2007 | King et al. | 318/375 |
| 2005/0173197 A1 * | 8/2005 | Takehara et al. | 187/277 |
| 2005/0173198 A1 * | 8/2005 | Takehara et al. | 187/277 |
| 2005/0224296 A1 * | 10/2005 | Smith et al. | 187/277 |
| 2005/0285554 A1 * | 12/2005 | King et al. | 318/376 |
| 2006/0061307 A1 | 3/2006 | Donellly | |
| 2006/0076171 A1 | 4/2006 | Donelly et al. | |
| 2008/0121444 A1 * | 5/2008 | Bauer | 180/65.1 |

* cited by examiner

*Primary Examiner*—Paul Ip
(74) *Attorney, Agent, or Firm*—Merchant & Gould P.C.

(57) ABSTRACT

A load-lifting apparatus has one or more prime power sources, one or more energy storage systems and regenerative braking. Regenerative energy is recovered when the load-lifting apparatus lowers its load. The elements of the prime power sources, energy storage devices and electrical components may be distributed to provide stability for the load-lifting apparatus. The general power architecture and energy recovery method can be applied to cranes, rubber-tired gantry cranes, overhead cranes, mobile cranes, ship-to-shore cranes, container cranes, rail-mounted gantry cranes, straddle carrier cranes and elevators. In such an architecture, the energy storage system helps alleviate the power rating requirement of the prime power source with respect to the peak power requirement for lifting a load.

20 Claims, 13 Drawing Sheets

LOAD-LIFTING APPARATUS AND METHOD OF STORING ENERGY FOR THE SAME

CROSS REFERENCE TO RELATED APPLICATION

The present application claims the benefits, under 35 U.S.C. §119(e), of U.S. Provisional Application 60/804,614 entitled "Hybrid Gantry Crane" filed Jun. 13, 2006, which is incorporated herein by reference.

FIELD OF THE INVENTION

The present invention relates generally to the design of a load-lifting apparatus. More particularly, the present invention relates to a load-lifting apparatus comprising one or more prime power sources, one or more energy storage systems and a means of regenerative braking. The general power architecture and energy recovery method can be applied to elevators. The invention also relates to a method for storing energy for a load-lifting apparatus.

BACKGROUND OF THE INVENTION

Rubber-Tired Gantry ("RTG") cranes are widely used in port facilities to move cargo, especially large cargo containers. These cranes typically can lift and transport loads weighing in the range of about 10,000 kilograms to about 50,000 kilograms. RTG cranes are typically powered by a diesel engine whose mechanical energy is converted to DC electrical power which is then used to drive AC lift and propulsion drive motors. The diesel engine is typically oversized to provide peak power bursts and prevent excessive voltage drop when lifting. These engines are typically run at constant speed for frequency control and so are not maximized for fuel efficiency. In typical service, the RTG crane has a duty cycle with a high idle content which reduces overall fuel efficiency and increases unwanted emissions.

Overhead cranes are similar to RTG cranes except they follow a predetermined track. These cranes typically can lift and transport loads weighing in the range of about 10,000 kilograms to about 120,000 kilograms. References to RTG cranes hereafter are understood to include overhead cranes as well.

The duty cycle of an RTG crane is similar in many ways to a yard switching locomotive. One of the present inventors, Donnelly, has disclosed the use of a battery-dominant hybrid locomotive in U.S. Pat. No. 6,308,639 which is designed to reduce emissions and fuel consumption for locomotives used in yard switching and other industrial applications which have duty cycles similar to that of an RTG crane. U.S. Pat. No. 6,308,639 is incorporated herein by reference.

In U.S. patent application Ser. No. 11/200,881 filed Aug. 19, 2005 entitled "Locomotive Power Train Architecture", now U.S. Pat. No. 7,304,445 Donnelly et al. have further disclosed a general electrical architecture for locomotives based on plurality of power sources, fuel and drive train combinations. The power sources may be any combination of engines, fuel cells, energy storage and regenerative braking. This general electrical propulsion architecture is also applicable to RTG cranes. U.S. patent application Ser. No. 11/200,881 is also incorporated herein by reference.

Donnelly et al. have further disclosed a system for controlling a dynamic and regenerative braking system for a hybrid locomotive which employs a control strategy for orchestrating the flow of power amongst the prime mover, the energy storage system and the regenerative braking system in a U.S. patent application Ser. No. 11/200,879 filed Aug. 9, 2005 entitled "Regenerative Braking Methods for a Hybrid Locomotive" which is also incorporated herein by reference.

In addition, Donnelly et al. have disclosed a method of dynamic braking of a locomotive which is operable down to very low speeds in a U.S. patent application filed Apr. 19, 2006 entitled "Dynamic Braking for a Hybrid Locomotive" which is also incorporated herein by reference.

U.S. Pat. No. 6,688,481 entitled "Mobile Crane" discloses a hybrid mobile crane wherein "at least one electric motor propels the undercarriage in an operating direction and is supplied with electric power for driving and crane operations by a power supply unit which is connected to the at least one electric motor by a cabling and configured as a diesel-electric drive, or a battery, or a multi-system drive formed by a combination of a diesel-electric drive with a battery, or a fuel-cell system." When electric power is supplied by the multi-system drive configuration, propulsion and lifting operations are carried out predominantly by the diesel-electric drive and only temporarily by the battery. When operating in an enclosed environment, the crane may be operated using battery power only where battery obtains most of its energy from power outlet of the electric mains so that the crane operation can be carried out without emission of pollutants.

This type of crane typically has superstructure rotatably mounted on the undercarriage for supporting a counterweight, a slewable telescopic boom assembly and an operator's cab. U.S. Pat. No. 6,688,481 discloses a hybrid version of this mobile crane which is intended to overcome two shortcomings of the non-hybrid mobile crane. These are (1) the restriction on the freedom of placement that all power components and (2) operations that inevitably result in engine-torque jumps and transient operating states that are determinative for the toxic constituents contained in the exhaust gas. The mobile crane of U.S. Pat. No. 6,688,481 does not indicate that it can utilize a large battery pack such as would be necessary to store a large amount of energy nor provide significant additional power surge capability when needed. Further, the mobile crane of U.S. Pat. No. 6,688,481 does not include a regenerative braking capability and so does not maximize fuel efficiency. The mobile crane of U.S. Pat. No. 6,688,481 includes the possibility of using fuel cells but appears to use fuel cells in place of a battery pack, not as a possible prime power source.

Other prior art documents disclose the use of energy storage units for load-lifting devices. U.S. Pat. No. 4,456,097 by Salihi discloses a battery-powered elevator system. In this system, the battery is charged by a battery charger and is regenerated by a polyphase motor. However, the charge of the battery is mainly supplied externally and is separate from the internal power architecture of the elevator.

U.S. Pat. No. 6,732,838 by Okada et al. discloses an AC. elevator including a power source with a rechargeable battery. However, the battery is not directly connected to the DC power bus of the system and requires a charge control element, while being restricted to AC motors.

U.S. Pat. Nos. 5,936,375 and 7,165,654 by Enoki and Takehara et al. respectively disclose a method for energy storage and recovery for load hoisting equipment. These prior art documents mention that combination battery and generator energy storage systems have been utilized to accomplish this result in the past, and theoretically they are very effective. However, these documents state that, according to their knowledge, the battery component imposes numerous problems such as: small electrical capacity, electrical inefficiency, large physical battery volume, heavy weight, and short battery life, whereby such a system is not currently a viable way to accomplish energy storage utilizing even state-of-the-art battery technology. The authors then suggest methods of using flywheel and/or capacitor systems for storing energy.

There thus remains a need for a load-lifting apparatus that utilizes a common DC bus architecture that can be operated on any type of prime power supply and recoup and store a significant amount of energy through regenerative braking primarily when the load is being lowered. There is also a need for a power architecture that would allow an efficient use of battery power storage systems for load-lifting applications.

SUMMARY

These and other advantages will be apparent from the disclosure of the invention(s) contained herein.

According to the present invention, there is provided a load-lifting apparatus comprising:
  i) at least one motor for driving a mechanical load-lifting device having a load-lifting average power and a load-lifting peak power;
  ii) at least one energy storage unit for storing electric energy and supplying said electric energy to the at least one motor, having an energy storage capacity and an energy storage unit output power;
  iii) at least one prime power system having a prime power system rated power, being electrically connected to the at least one energy storage unit and the at least one motor for selectively providing electrical energy to the at least one energy storage unit and—to the at least one motor;
  iv) a bus electrically connecting the at least one energy storage unit, the at least one prime power system and the at least one motor; and
  v) a control system for controlling the operation of the at least one prime power system and the load-lifting apparatus, and for monitoring the at least one energy storage unit, wherein the at least one motor selectively receives operational energy from the at least one energy storage unit and the at least one prime power system, the at least one motor supplies regenerative braking energy to the bus when the load-lifting device lowers a load, and wherein the ratio of the at least one prime power system rated power to the load-lifting peak power is between 0.2 and 0.7.

According to the present invention, there is also provided a method of storing energy in a load-lifting apparatus comprising the steps of:
  a) providing a load-lifting apparatus comprising:
    i) at least one motor for driving a mechanical load-lifting device having a load-lifting average power and a load-lifting peak power;
    ii) at least one energy storage unit for storing electric energy and supplying said electric energy to said at least one motor, having an energy storage capacity and an energy storage unit output power;
    iii) at least one prime power system having a prime power system rated power, being electrically connected to the at least one energy storage unit and the at least one motor for selectively providing electrical energy to the at least one energy storage unit and to the at least one motor;
    iv) a bus electrically connecting the at least one energy storage unit, the at least one prime power system and the at least one motor; and
    v) a control system for controlling the operation of the at least one prime power system and the load-lifting apparatus, and for monitoring the at least one energy storage unit,
  b) selectively providing to the at least one motor operational energy from the at least one energy storage unit and the at least one prime power system; and
  c) supplying regenerative braking energy from the at least one motor to the electrical bus when the load-lifting device lowers a load, wherein the ratio of the at least one prime power system rated power to the load-lifting peak power is between 0.2 and 0.7.

The various embodiments and configurations of the present invention are also directed generally to a hybrid power system for a rubber-tired gantry crane. This hybrid power system can also be adapted to overhead cranes, mobile cranes, rotatable cranes and elevators. The hybrid power system may be comprised of one or more prime power sources engines and one or more energy storage systems. The prime power sources may include internal combustion engines, diesel engines, gas turbine engines, microturbines, Stirling engines, spark ignition engines, fuel cells, solar cells, AC electrical networks and wind turbines. The energy storage systems may include battery packs, capacitor banks, compressed air storage systems, and flywheels. The crane may utilize either AC or DC drive motors for propulsion, hoisting or trolley functions. The hybrid system is configured to allow recovery of energy to the energy storage system through regenerative braking methods primarily from the hoist drive motor as it lowers its load. The energy storage system can also accept energy for many successive lifts.

The principal advantages of this invention are substantial increased fuel efficiency and lower noxious prime power emissions. In an energy storage dominant configuration, the hybrid RTG crane can be operated on stored power alone and so can be operated quietly and without any noxious emissions inside confined quarters. The components of the hybrid power system can be distributed at different convenient locations on the gantry or crane structure so as to provide enhanced stability as well as ease of service. Furthermore, the power system architecture of the present invention allows a reduction in the size of the generator used to power the crane or load-lifting apparatus, as the energy storage system helps alleviate the power rating requirement of the prime power source with respect to the peak power requirement for lifting a load.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

An engine refers to any device that uses energy to develop mechanical power, such as motion in some other machine. Examples are diesel engines, gas turbine engines, microturbines, Stirling engines and spark ignition engines.

A prime power source refers to any device that uses energy to develop mechanical or electrical power, such as motion in some other machine. Examples are diesel engines, gas turbine engines, microturbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

An electrical energy converter refers to an apparatus that transmits or blocks the flow of electrical energy and may also increase or reduce voltage and change the frequency of the transmitted energy including changing the frequency to zero. Examples but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

A power control apparatus refers to an electrical apparatus that regulates, modulates or modifies AC or DC electrical power. Examples are an inverter, a chopper circuit, a boost circuit, a buck circuit or a buck/boost circuit.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (non-conducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
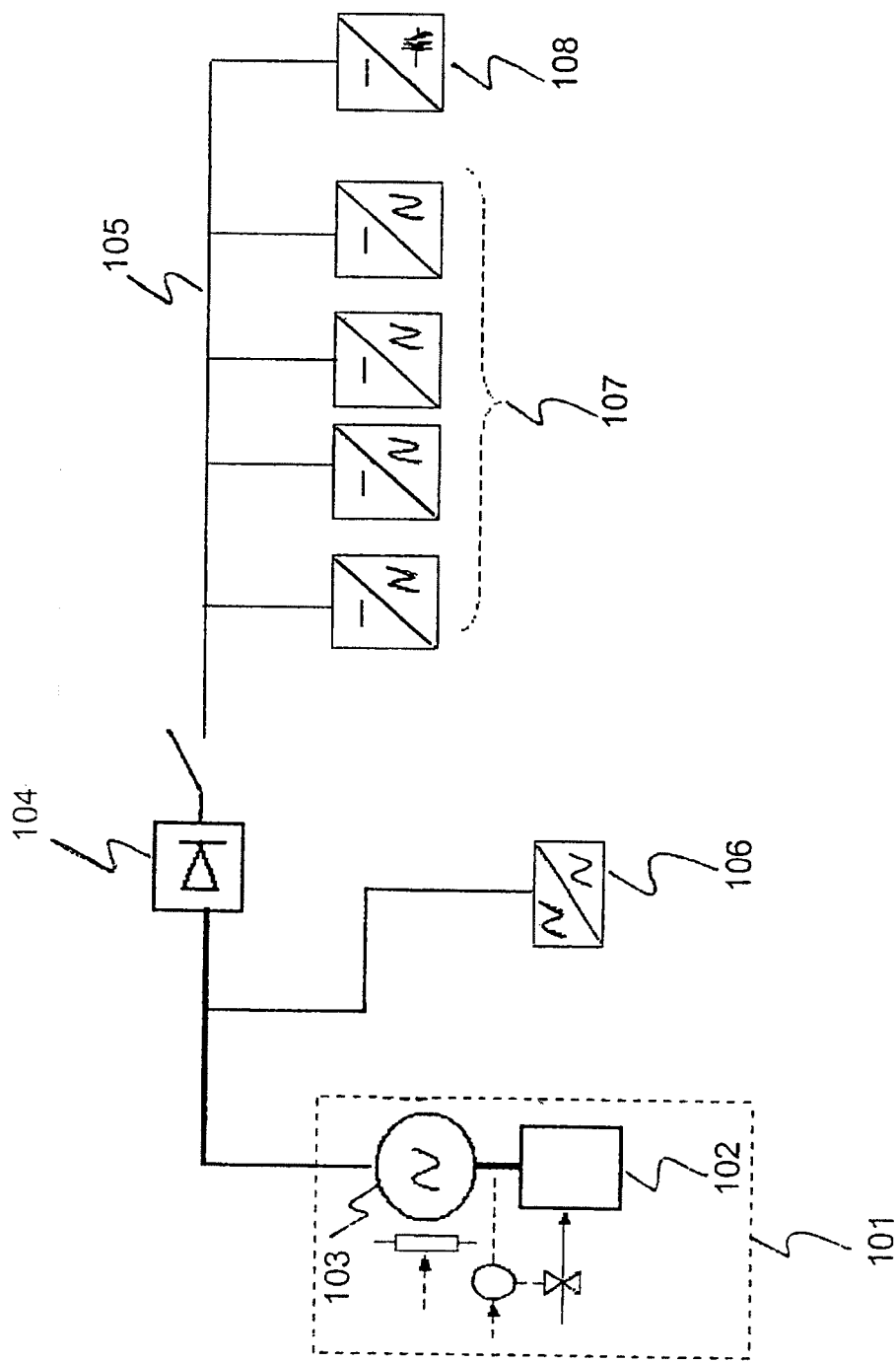
FIG. 1 is a prior art schematic of a rubber-tired gantry crane power system.

FIG. 1 is a prior art schematic of a rubber-tired gantry crane power system. Prime power is provided by a diesel genset 101 which is comprised of a diesel engine 102 and an alternator 103 which converts mechanical power from the engine 102 to AC electrical power. AC power is available for the crane's auxiliary power systems 106 and is converted by rectifier 104 to DC power supplied to a DC bus 105 for distribution to operate electric motors 107 for propelling the crane and to carry out other crane operations such as traversing and, lifting and lowering. The crane may also have a dynamic brake capability 108 which allows the motors 107 to act as electrical generators providing a braking force while lowering a load. The electrical energy generated by the dynamic braking system 108 is typically dissipated in a resistive grid (not shown).

Figure 2:
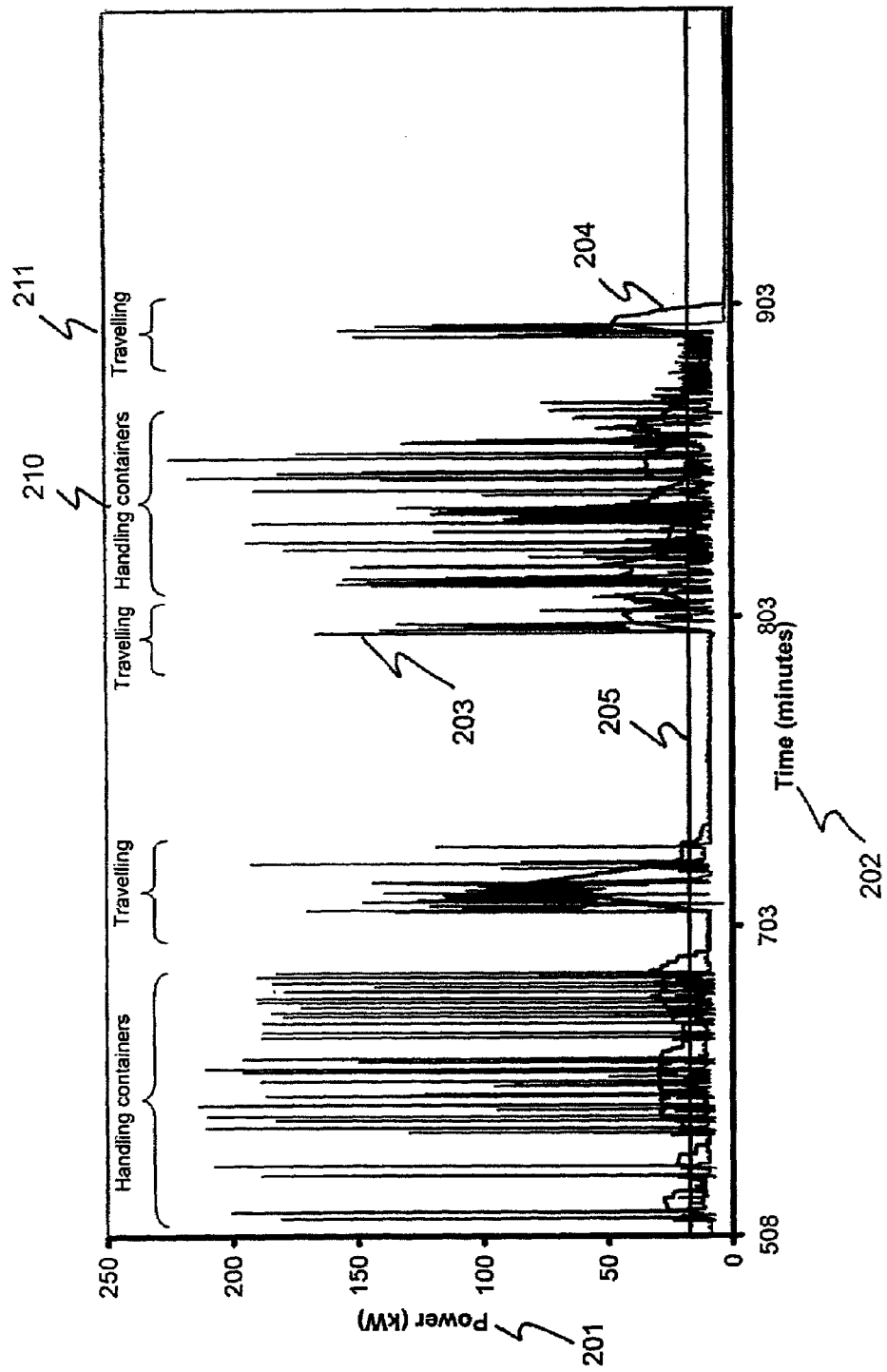
FIG. 2 is a graph showing a typical duty cycle of a prior art rubber-tired gantry crane.

FIG. 2 is a graph showing a typical duty cycle of a prior art rubber-tired gantry crane. FIG. 2 shows power 201 versus time 202 for a portion of an RTG crane operating cycle (approximately 6.5 hours). The plot shows a peak power curve 203, an average power curve 205 (average power over the entire interval) and a rolling average power curve 204 (in this example, a 3 minute rolling average). As can be seen, the power peaks can be on the order of 10 to 15 times the average power 205. Average power levels 205 in this example vary typically between about 5% to about 20% of power peaks. Also shown are the power peaks typical of traveling 211 (the crane moving from one location to another) and handling or manipulating containers 210 (raising, lowering and traversing the crane lifting assembly). This type of duty cycle is well-suited for a hybrid system where power from one or more prime power sources can be stored in energy storage systems during low power portions of the duty cycle and can be discharged to augment the power from one or more prime power sources during high power portions of the duty cycle. This allows the total power capacity of the prime power system or systems to be lower than required if no energy storage were available.

Figure 3:
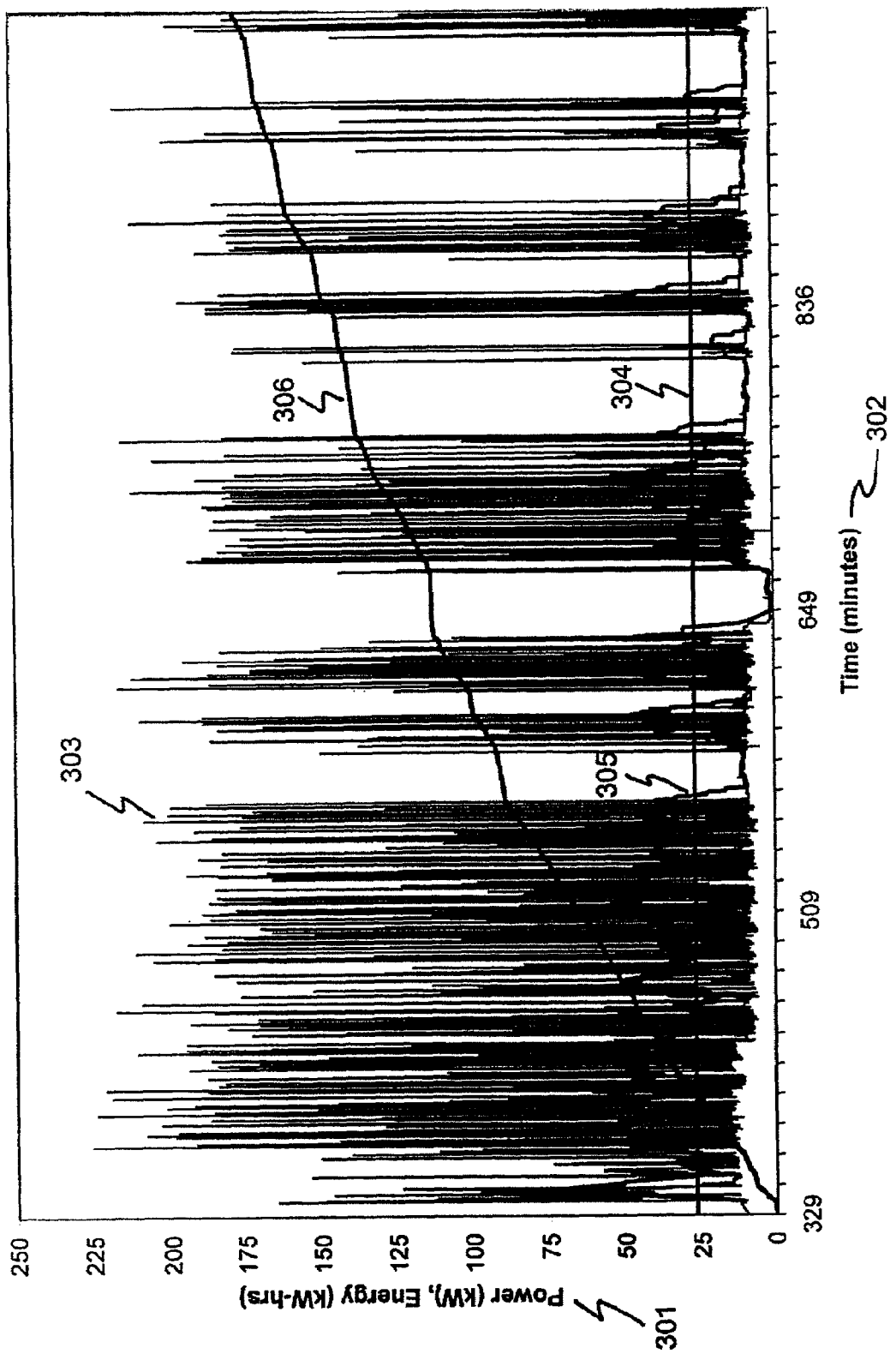
FIG. 3 is a graph showing a measured daily duty cycle of a rubber-tired gantry crane.

FIG. 3 is a graph showing a measured an approximately 11 hour period of a measured duty cycle of a rubber-tired gantry crane. FIG. 3 shows power and cumulative energy 301 versus time 302 for an RTG crane operating cycle over the duty cycle. The plot shows a peak power curve 303, an average power curve 304 (average power over the entire interval), a rolling average power curve 305 (in this example, a 3 minute rolling average) and cumulative energy used 306. As can be seen, the power peaks can be on the order of 10 times the average power 304. In this example, average power levels 304 vary typically between about 10% to about 40% of power peaks. The cumulative energy 306 used by the crane is equal to the area under any of the 3 power curves 303, 304 or 305. As can be seen, the cumulative energy used is a smooth function over time which is another characteristic of a duty cycle suitable for a hybrid system.

Figure 4:
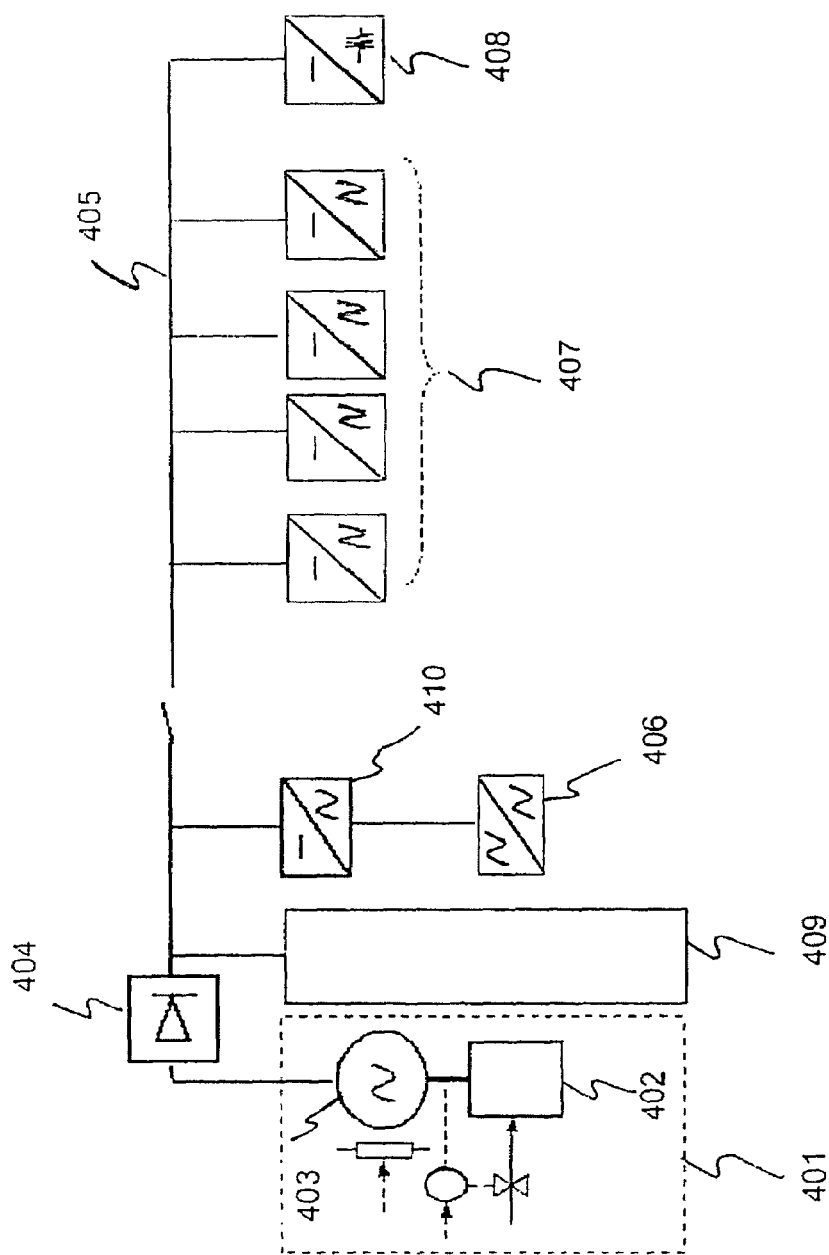
FIG. 4 is a schematic of a hybrid rubber-tired gantry crane power system.

As shown in FIG. 4, the present invention provides a load-lifting apparatus comprising at least one motor 407 for driving a mechanical load-lifting device having a load-lifting average power and a load-lifting peak power. The load-lifting apparatus also comprises at least one energy storage unit 409 for storing electric energy and supplying said electric energy to the at least one motor 407. The energy storage unit 409 has an energy storage capacity and an energy storage unit output power. The load-lifting apparatus also comprises at least one prime power system 401 having a prime power system rated power, being electrically connected to the at least one energy storage unit 409 and the at least one motor 407 for selectively providing electrical energy to the at least one energy storage unit 409 and—to the at least one motor 407. The load-lifting apparatus also comprises a bus 405 electrically connecting the at least one energy storage unit 409, the at least one prime power system 401 and the at least one motor 407. The load-lifting apparatus further comprises a control system for controlling the operation of the at least one prime power system 401 and the load-lifting apparatus, and for monitoring the at least one energy storage unit 409. The at least one motor 407 selectively receives operational energy from the at least one energy storage unit 409 and the at least one prime power system 401. The at least one motor 407 supplies regenerative braking energy to the bus 405 when the load-lifting device lowers a load. The ratio of the at least one prime power system rated power to the load-lifting peak power is between 0.2 and 0.7.

According to the present invention, there is also provided a method of storing energy in a load-lifting apparatus comprising the steps of:
 a) providing a load-lifting apparatus comprising:
  i) at least one motor 407 for driving a mechanical load-lifting device having a load-lifting average power and a load-lifting peak power;
  ii) at least one energy storage unit 409 for storing electric energy and supplying said electric energy to said at least one motor 407, having an energy storage capacity and an energy storage unit output power;
  iii) at least one prime power system 401 having a prime power system rated power, being electrically connected to the at least one energy storage unit 409 and the at least one motor 407 for selectively providing electrical energy to the at least one energy storage unit 409 and to the at least one motor 407;
  iv) a bus 405 electrically connecting the at least one energy storage unit 409, the at least one prime power system 401 and the at least one motor 407; and
  v) a control system for controlling the operation of the at least one prime power system 401 and the load-lifting apparatus, and for monitoring the at least one energy storage unit 409,
 b) selectively providing to the at least one motor 407 operational energy from the at least one energy storage unit 409 and the at least one prime power system 401; and
 c) supplying regenerative braking energy from the at least one motor 407 to the electrical bus 405 when the load-lifting device lowers a load, wherein the ratio of the at least one prime power system rated power to the load-lifting peak power is between 0.2 and 0.7.

Preferably, the electrical bus 405 returns the regenerative braking energy to the energy storage unit 409 to increase the stored energy when the load-lifting device lowers a load. Furthermore, the electrical bus 405 can also return regenerative braking energy to the prime power system 401 when the load-lifting device lowers a load.

Preferably, the energy storage capacity of the energy storage unit 409 is between 100 and 5,000 kW hours and the energy storage unit output power is between 50 and 2,500 kW. The prime power system rated power is also preferably between 50 and 5,000 kW.

Preferably, the prime power system 401 comprises a prime power source selected from the group consisting of engines, diesel engines, gas turbine engines, microturbines, Stirling engines, spark ignition engines, fuel cells, solar cells, AC electrical networks, power induction systems, wind turbines or a combination thereof.

Preferably, the energy storage unit 409 comprises an energy storage system selected from the group consisting of a battery pack, a bank of capacitors, a compressed air storage system, one or more flywheels or a combination thereof.

Preferably, the load-lifting device is selected from the group consisting of cranes, rubber-tired gantry cranes, overhead cranes, mobile cranes, ship-to-shore cranes, container cranes, rail-mounted gantry cranes, straddle carrier cranes and elevators.

Preferably, the motor is selected from the group consisting of variable frequency drive motors, AC drive motors, and DC drive motors.

According to another preferred embodiment of the present invention, the energy storage unit 409 can also provide power regulation to the prime power system 401.

FIG. 4 is also more specifically the schematic of a hybrid rubber-tired gantry crane power system. Prime power is provided by a diesel genset 401 which is comprised of a diesel engine 402 and an alternator 403 which converts mechanical power from the engine 402 to AC electrical power. The AC power is converted by rectifier 404 to DC power supplied to a DC bus 405 for distribution to operate electric motors 407 for propelling the crane and to carry out other crane operations such as trolleying and, hoist ascending and hoist descending In the configuration shown, power is also preferably supplied to an auxiliary power system 406 via an inverter 410 which converts DC power back to AC power appropriate for the auxiliary systems. As can be appreciated, power may be supplied directly to the auxiliary power system 406 from the output of alternator 403. An energy storage system 409 is shown connected electrically in parallel to the output of the rectifier 404 to the DC bus 405. The crane may also have a dynamic brake capability 408 which allows the motors 407 to act as electrical generators providing a braking force while lowering a load. The electrical energy generated by the dynamic braking system 408 may be returned to the energy storage system 409 for future use. If the electrical energy generated by the dynamic braking system 408 is excessive or if the energy storage system 409 is near full capacity, the a portion or all of the braking energy may be dissipated in a resistive grid (not shown).

Figure 5B:
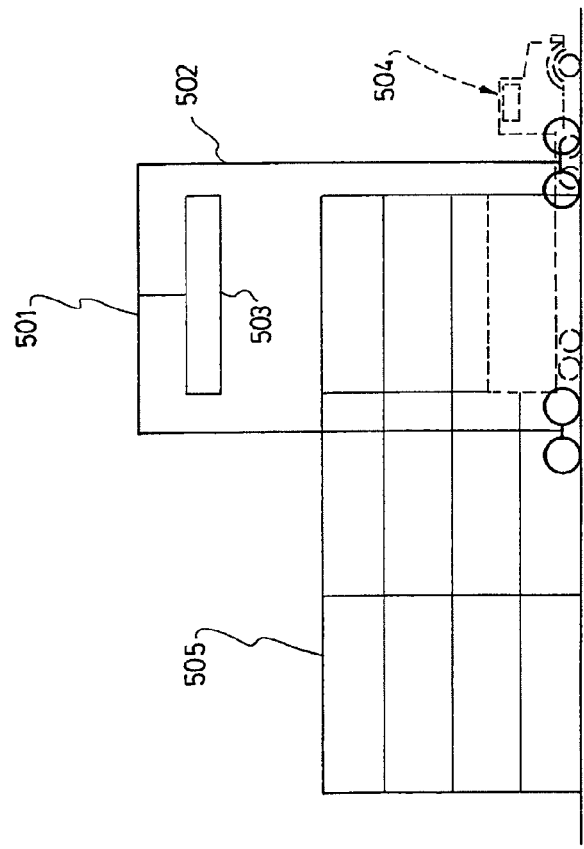
FIG. 5 is a schematic view showing a hybrid rubber-tired gantry crane loading a container on a truck.
Figure 5A:
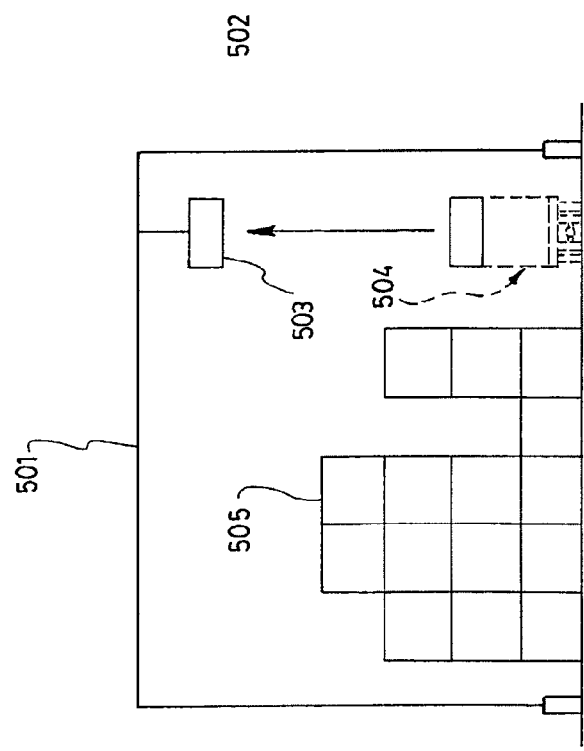

FIG. 5 is a schematic view showing a hybrid rubber-tired gantry crane loading a container on a truck. FIG. 5a shows an end view of an RTG crane comprised of legs 502 and a main trolley beam 501. In this view, a hoist and spreader assembly 503 moves laterally to pick up a container from the container pile 505 and moves it into position to be lowered onto, for example, a truck 504. The gravitational energy released during lowering can be recovered by operating the lift motor or motors as a generator or generators and using dynamic braking circuits to capture the electrical energy from the braking action. The energy, once converted to electrical form, may be recovered by an energy storage system or dissipated in a resistive braking grid. FIG. 5b shows a side view of the RTG crane comprised of legs 502 and a main trolley beam 501. In this view, aA hoist and spreader assembly 503 moves longitudinally to pick up a container from the container pile 505 and moves it into position to be lowered onto a vehicle for transportation (as shown) or moves it to another location for storage.

Figure 6A:
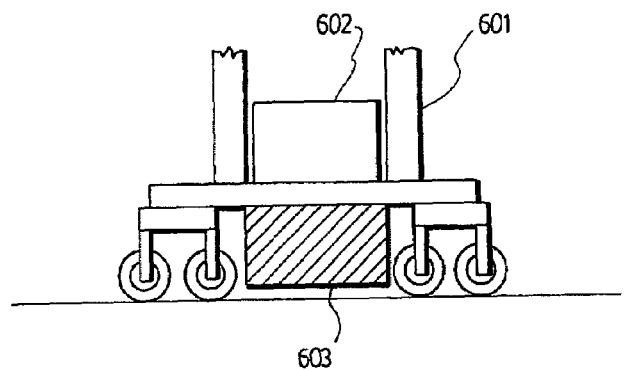
FIG. 6 is a side schematic view showing various possible locations for a prime power source and energy storage system for a hybrid rubber-tired gantry crane.
Figure 6B:
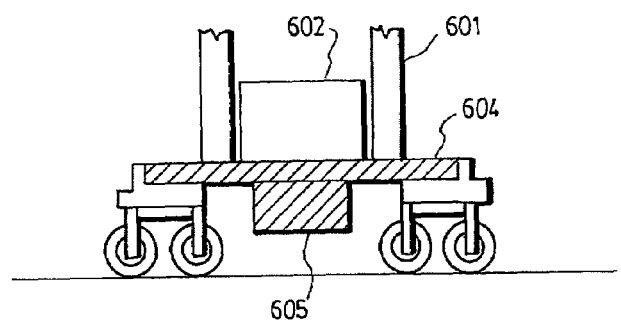
Figure 6C:
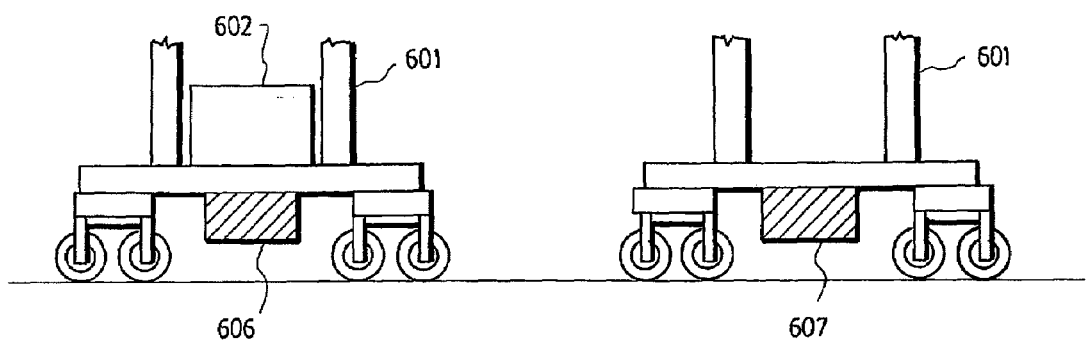

FIG. 6 is a side schematic view showing various possible locations for a prime power source and energy storage system for a hybrid rubber-tired gantry crane. In FIG. 6a, the lower components of an RTG crane is shown with legs 601 and electrical control panel 602. FIG. 6a shows a power pack 603 comprised of, for example, an engine and a battery pack installed under the main transversal beam of the RTG. FIG. 6b shows a power pack comprised of, for example, an engine 605 and a battery pack 604 where the engine 605 is installed under the main transversal beam of the RTG and the battery pack 604 is installed along the main transversal beam of the RTG. FIG. 6c shows a power pack separated into two modules 606 and 607 with the modules installed under each side of the main transversal beam of the RTG. The module 606 may be, for example, a battery pack and the module 607 may be, for example, an engine. As can be appreciated, an energy storage system such as for example a system of battery cells or capacitors may be distributed in different locations between the legs (as viewed from the side) of the RTG crane, depending on availability of space and weight distribution requirements. As will be discussed later, supplementary prime power units such as wind turbines and or solar cells may be installed on top of the trolley beam.

Figure 7:
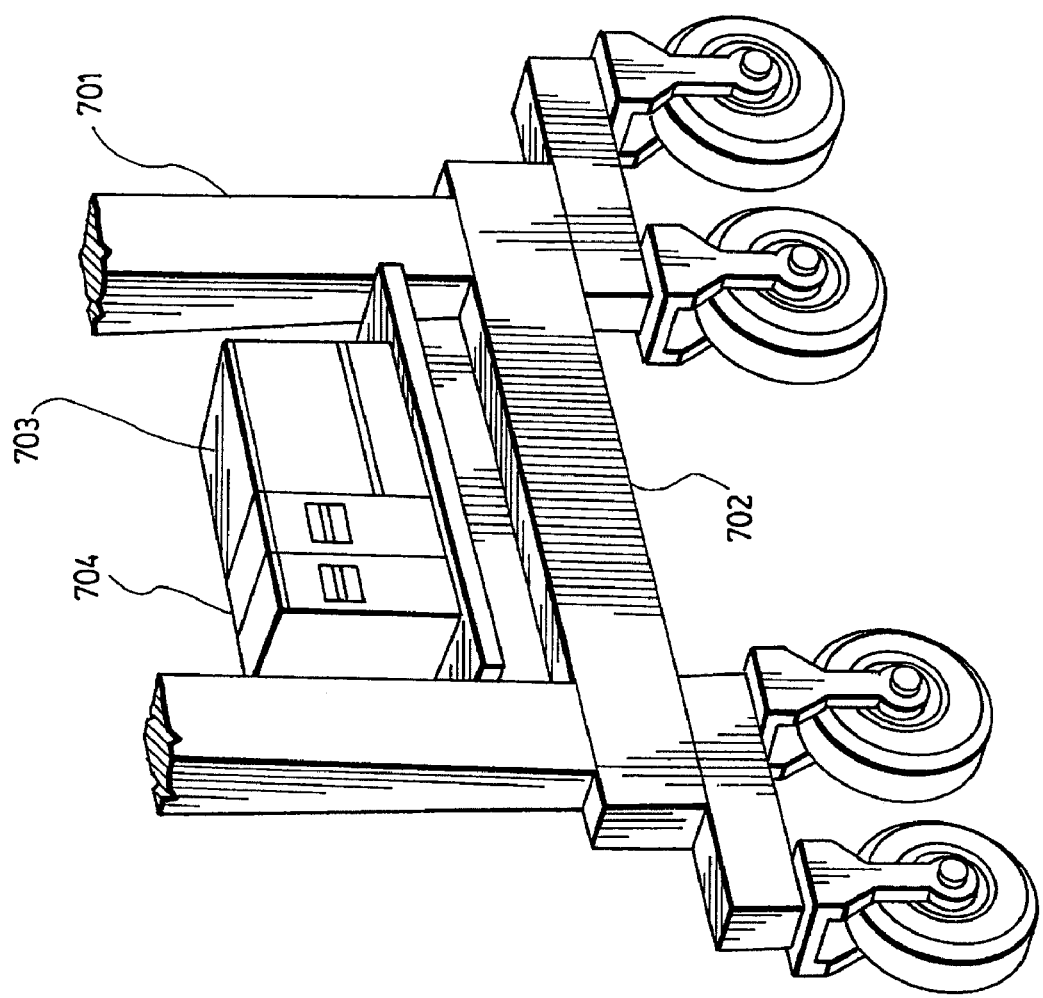
FIG. 7 is an isometric schematic view showing a hybrid power pack between the legs of a rubber-tired gantry crane.

FIG. 7 is an isometric schematic view showing a hybrid power pack between the legs of a rubber-tired gantry crane. This figure shows a power pack comprised of, for example, an engine or fuel cell prime power system 703 and an energy storage system comprised of, for example, a battery pack or capacitor bank 704 mounted astride the main transversal beam 702 and between legs 701 of an RTG as seen from one side The prime power supply for the hybrid RTG crane may be a diesel engine, several smaller diesel engines or a fuel cell system. As can be appreciated, these components can be mounted between the legs of the gantry near the bottom of the crane to provide stability to the gantry while lifting, lowering or moving as the load. The energy storage system (typically a battery pack or capacitor bank) can also be mounted between the legs of the gantry near the bottom of the crane to provide stability to the gantry while lifting, lowering or moving as the load. The battery pack can be broken up into modules if necessary to better distribute the load.

As an example, a prior art diesel-powered RTG crane may have an engine system weighing about 8,000 kg. If converted to a battery dominant hybrid configuration, the hybrid RTG crane might have a small diesel generator system weighing about 2,250 kilograms. It might also have a battery pack with 350 kW-hrs of storage capacity being comprised of 320 cells for a total weight of about 13,500 kilograms. Such an energy storage system would have a peak power output capability in the range of 500 kW.

The components of this hybrid system can be distributed between the legs of the gantry near the bottom of the crane to provide stability. For example, the engine system and power electronics can be located on one side while the battery pack can be broken into two modules and located on the other side of the gantry.

In a preferred embodiment of the present invention, the load-lifting device is a rubber-tired gantry crane comprising legs and the prime power system or the energy storage unit is mounted between a pair of said legs proximate a bottom end of said legs.

In another preferred embodiment of the present invention, the energy storage unit is mounted between a first pair of legs proximate a bottom end of the legs on a first side of the gantry crane and the prime power system is mounted between a second pair of legs proximate a bottom end of the legs on the opposite side of the gantry crane. Hence, it can be seen that the energy storage unit can also preferably form part of a counterweight in the load-lifting apparatus.

In accordance with another preferred embodiment of the present invention, the energy storage unit and the prime power system are sized and provided in a form adapted to retrofit with an existing receiving means on the load-lifting device for receiving a diesel engine and a generator set. The receiving means is any known structure or interface used on the load-lifting device for accommodating a diesel engine and a generator set, or any power system originally installed on the load-lifting device. Consequently, older load-lifting devices may be refurbished with the power system in accordance with the present invention.

Figure 8:
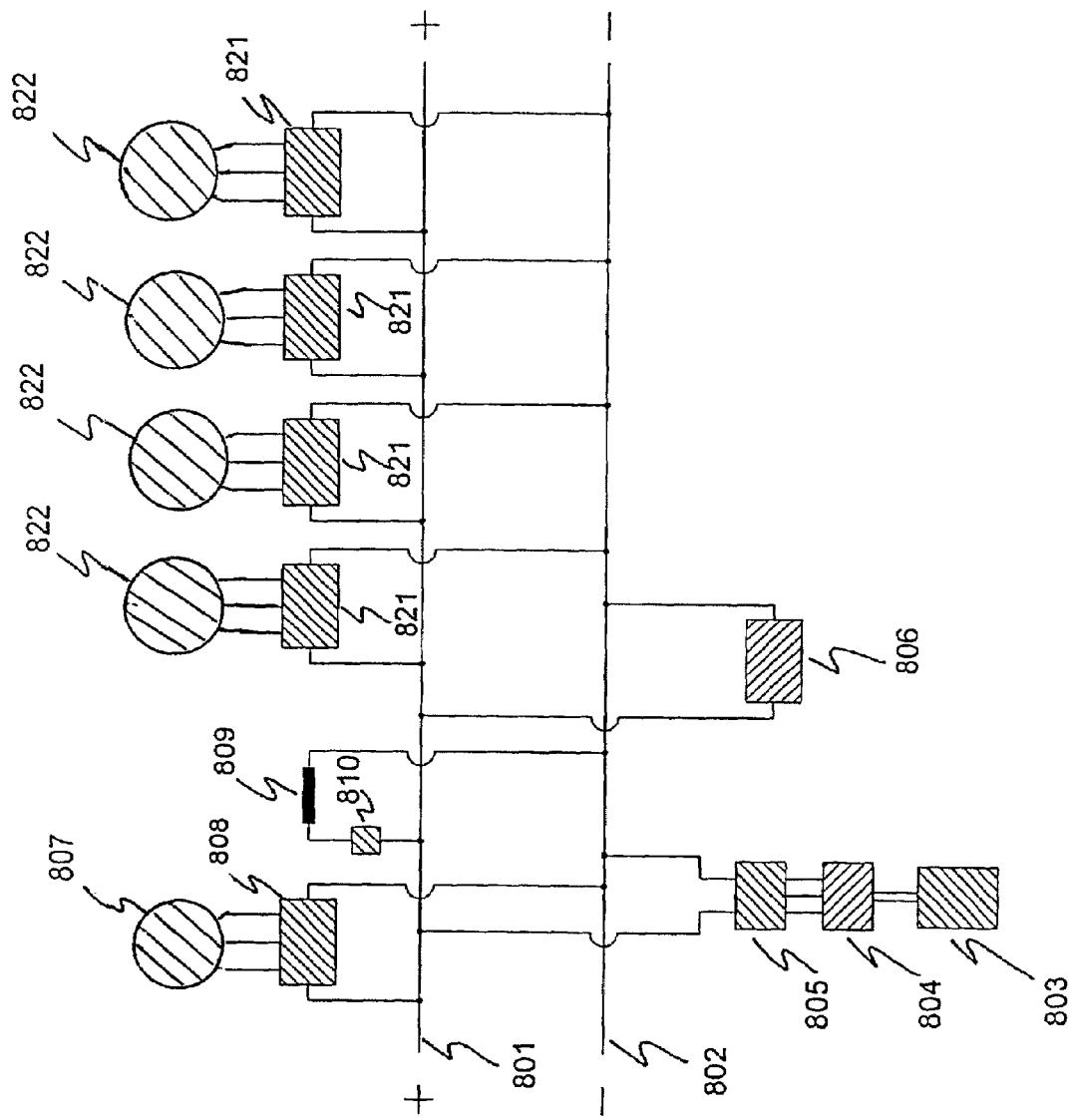
FIG. 8 is a block schematic of the elements of a basic hybrid crane power system.

FIG. 8 is a block schematic of the elements of a basic hybrid crane power system. The principal elements of the power supply system are an engine system comprised of an engine 803, an alternator 804 and a rectifier 805, and an energy storage system such as for example a battery pack 806 which are shown connected in parallel to a DC bus with a positive side 801 and a negative side 802. The main gantry propulsion, hoist and trolley drive motors 822 are shown here as AC motors connected to the DC bus by inverters 821. The gantry auxiliary power supply is shown here as an AC motor 807 connected to the DC bus by inverter 808. As can be seen, the drive motors 822 and auxiliary power supply 807 can receive power from either the engine system or the energy storage system or both simultaneously. Preferably, the method in which power is supplied is typically controlled by a controller (not shown) which may be an analog device, a programmable logic controller ("PLC") or a computer. This basic electrical power architecture can support a regenerative braking system comprised of a dynamic braking grid 809 which can be connected to the DC bus by a switch 810 and means to recover energy from the drive motors acting as generators, for example when the load is being lowered by the RTG crane, and, if needed, direct that energy to provide charging of the energy storage system 806. In the configuration shown, the energy storage system may be a battery pack whose voltage level controls the voltage level on the DC bus. As can be appreciated, a buck-boost circuit can be interposed between the DC bus and battery pack to allow independent control of the voltage on the DC bus. In another preferred embodiment of the present invention, the system can further comprise a power-dissipating load for dissipating excess regenerative braking energy on the electrical bus.

Figure 9:
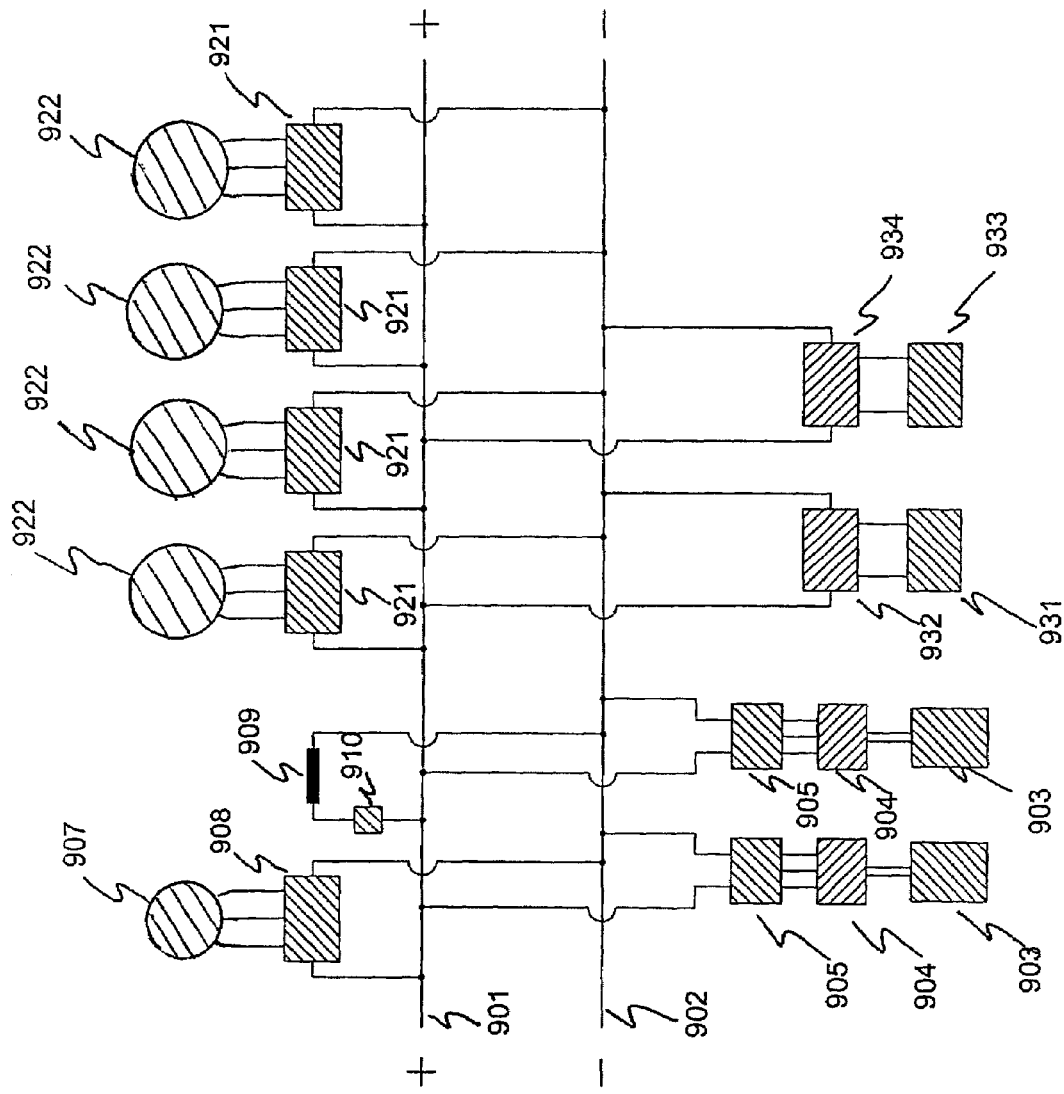
FIG. 9 is a block schematic of the elements of a multi-engine and multiple energy storage system hybrid crane power system.

FIG. 9 is a block schematic of the elements of a multi-engine and multi-energy storage configuration for a hybrid crane power system. The principal elements of the power supply system are two engine systems each comprised of engine 903, alternator 904 and rectifiers 905, and energy storage systems such as for example a battery pack 931 and capacitor bank 933, all of which are shown connected in parallel to a DC bus with a positive side 901 and a negative side 902. Buck-boost circuits 932 and 934, for example, can be interposed between the DC bus and energy storage systems to allow independent control of the voltage on the DC bus. For example, the capacitor bank 933 may be used for high power peaks while the battery pack 931 may be used for the bulk of the energy storage. The main gantry propulsion, hoist and trolley drive motors 922 are shown here as AC motors connected to the DC bus by inverters 921. The RTG auxiliary power supply is shown here as an AC motor 907 connected to the DC bus by inverter 908. As can be seen, the drive motors 922 and auxiliary power supply 907 can receive power from either of the engine systems or the energy storage systems or all simultaneously. This basic electrical power architecture can support a regenerative braking system comprised of a dynamic braking grid 909 which can be connected to the DC bus by a switch 910 and means to recover energy from the drive motors acting as generators, for example when the load is being lowered by the RTG crane, and, if needed, direct that energy to provide charging of either of the energy storage systems 931, 933.

Figure 10:
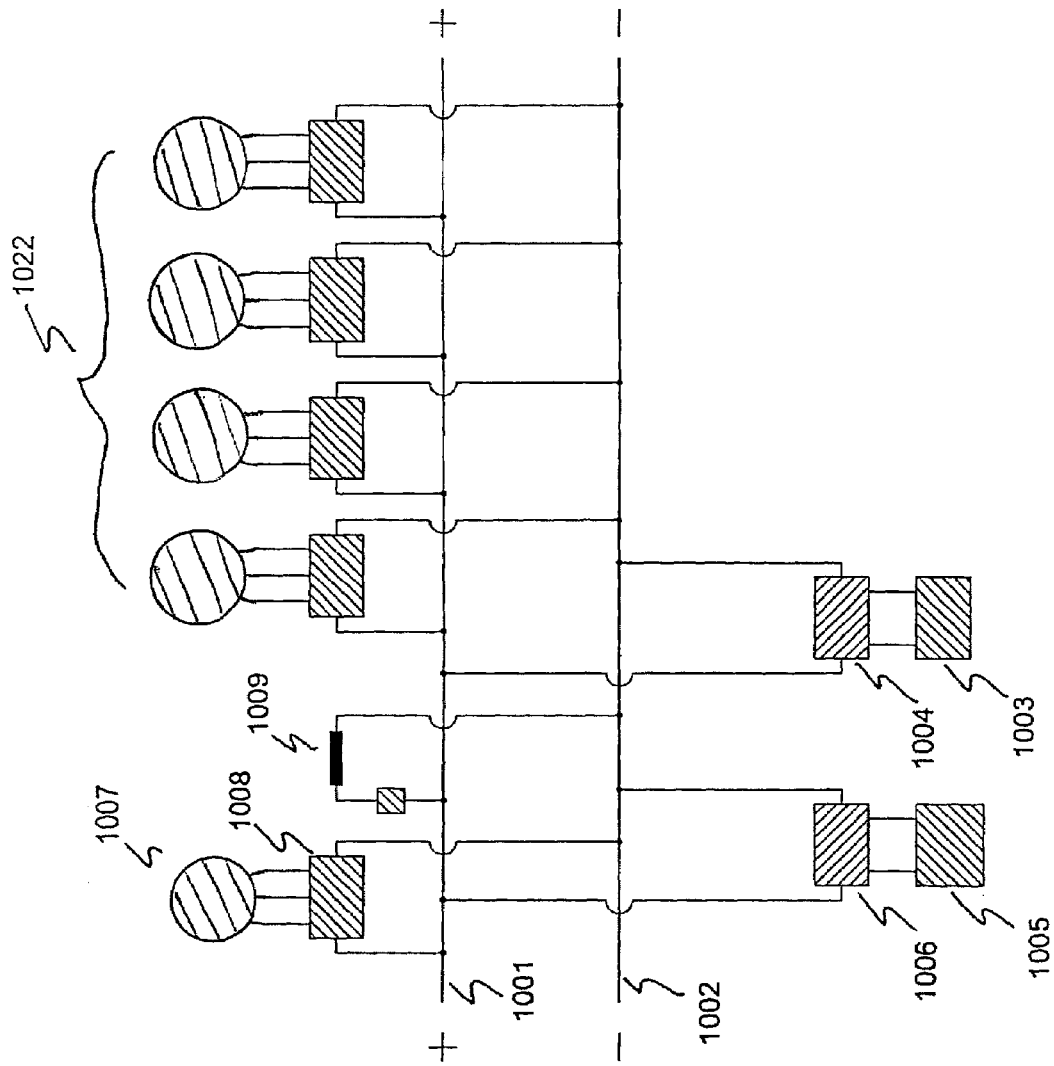
FIG. 10 is a block schematic of the elements of a multi-fuel cell hybrid crane power system.

FIG. 10 is a block schematic of the elements of a multi-fuel cell and energy storage system hybrid crane power system. The principal elements of the power supply system are two fuel cell systems comprised of fuel cells 1003 and voltage regulators 1004, and an energy storage system such as for example a battery pack 1005, all of which are shown connected in parallel to a DC bus with a positive side 1001 and a negative side 1002. A buck-boost circuit 1006, for example, can be interposed between the DC bus and the energy storage system 1005 to allow independent control of the voltage on the DC bus. The main gantry propulsion, hoist and trolley drive motors 1022 are shown here as AC motors connected to the DC bus by inverters. The RTG auxiliary power supply is shown here as an AC motor 1007 connected to the DC bus by inverter 1008. As can be seen, the drive motors 1022 and auxiliary power supply 1007 can receive power from either of the fuel cell systems or the energy storage system or all simultaneously. This basic electrical power architecture can support a regenerative braking system comprised of a dynamic braking grid 1009 which can be connected to the DC bus by a switch and means to recover energy from the drive motors acting as generators, for example when the load is being lowered by the RTG crane, and, if needed, direct that energy to provide charging of the energy storage systems 1006.

Figure 11:
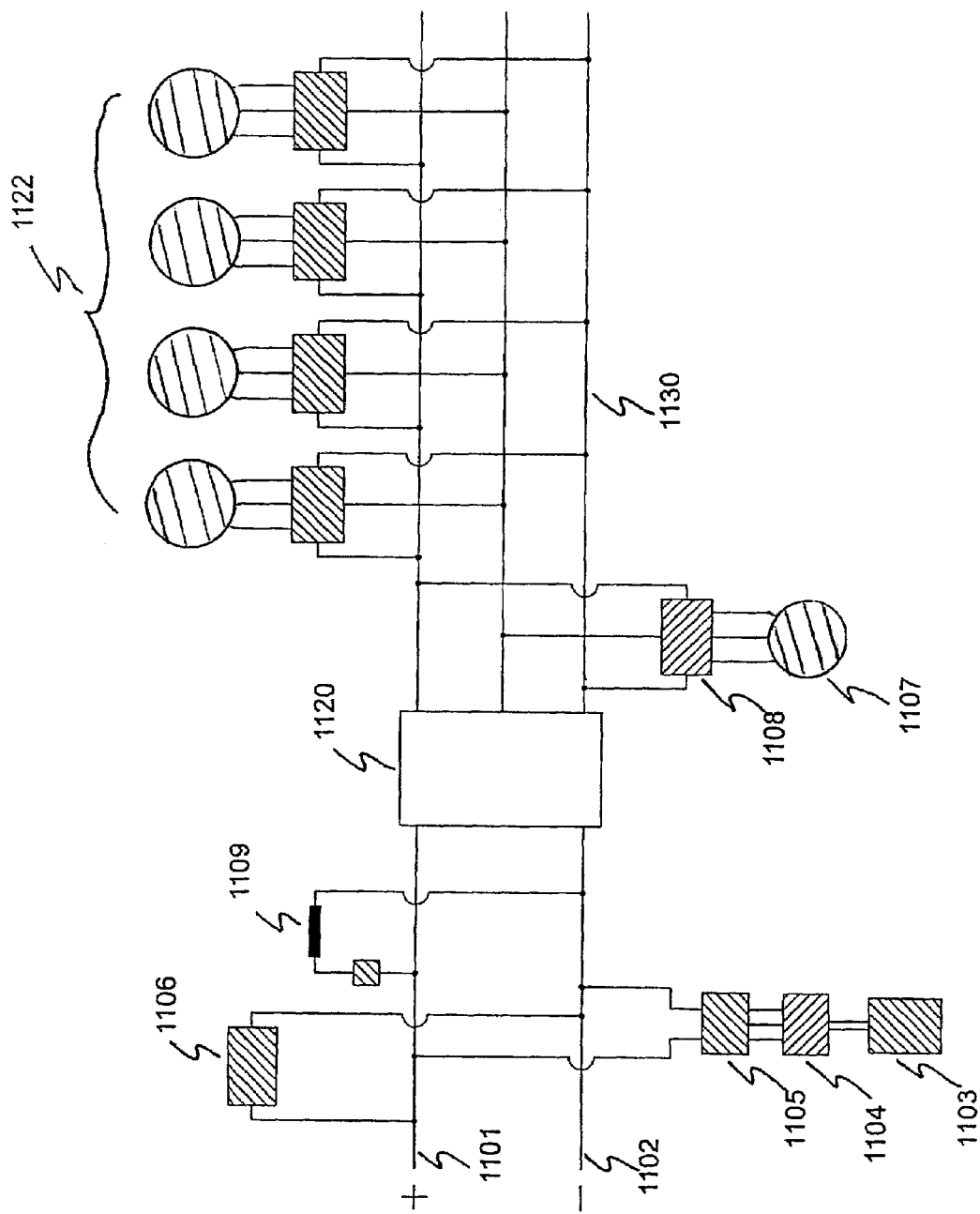
FIG. 11 is a block schematic of the elements of a hybrid crane power system with an AC bus.

FIG. 11 is a block schematic of the elements of a hybrid crane power system with an AC bus. The principal elements of the power supply system are an engine system comprised of an engine 1103, an alternator 1104 and a rectifier 1105, and an energy storage system such as for example a battery pack 1106 which are shown connected in parallel to a DC bus with a positive side 1101 and a negative side 1102. A regenerative braking system comprised of a dynamic braking grid 1109 which can be connected to the DC bus by a switch and means to recover energy from the drive motors acting as generators, for example when the load is being lowered by the RTG crane, and, if needed, direct that energy to provide charging of the energy storage system 1106. In the configuration shown, the energy storage system may be a battery pack whose voltage level controls the voltage level on the DC bus. As can be appreciated, a buck-boost circuit can be interposed between the DC bus and battery pack to allow independent control of the voltage on the DC bus. In this configuration, a DC to AC converter 1120 connects the DC bus to an AC bus 1130. The AC bus provides AC power to the main gantry propulsion, lift and trolley drive motors 1122 connected to the AC bus by AC regulators. The gantry auxiliary power supply is shown here as an AC motor 1107 connected to the AC bus by AC regulators 1108. As can be seen, the drive motors 1122 and auxiliary power supply 1107 can receive power from either the engine system or the energy storage system or both simultaneously. The method in which power is supplied is typically controlled by a controller (not shown) which may be a programmable logic controller ("PLC") or a computer.

Figure 12:
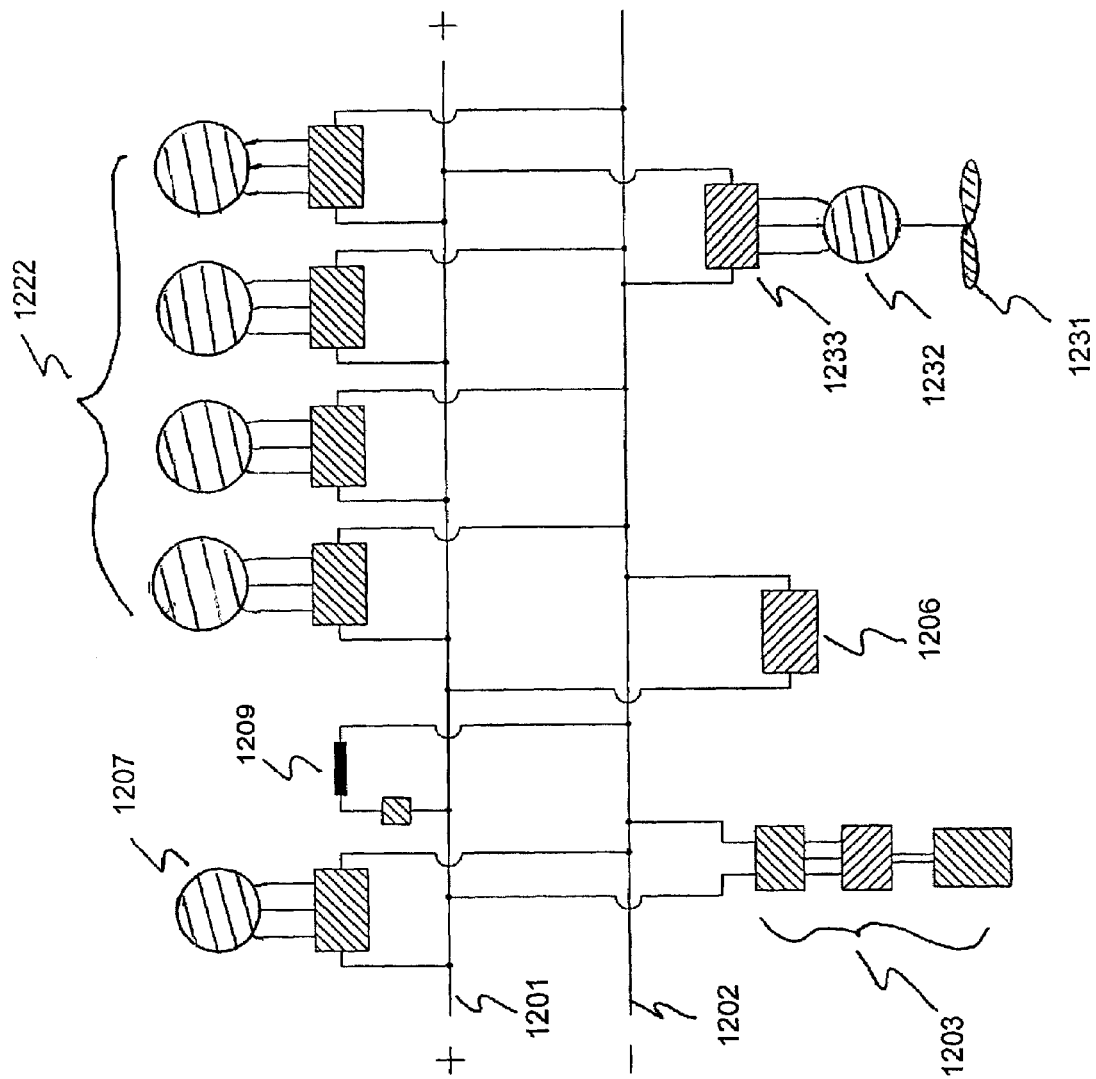
FIG. 12 is a block schematic of the elements of a hybrid crane power system with an engine and a wind turbine power source.

FIG. 12 is a block schematic of the elements of a hybrid crane power system with an engine and a wind turbine power source. This power system is similar to that of FIG. 8 except it shows an auxiliary wind turbine prime power system to augment the power to the system when wind is available. The wind turbine system is comprised, for example, of a turbine propeller 1231, a turbine motor 1232 and a power matching circuit 1233. The turbine is shown connected to the DC bus in parallel with an engine system 1203 and an energy storage system 1206. The wind turbine can be used to provide energy to the gantry motors 1222 or to charge the energy storage system 1206. This application is particularly useful as cranes are often used in areas like ports that are often subject to strong winds.

Figure 13:
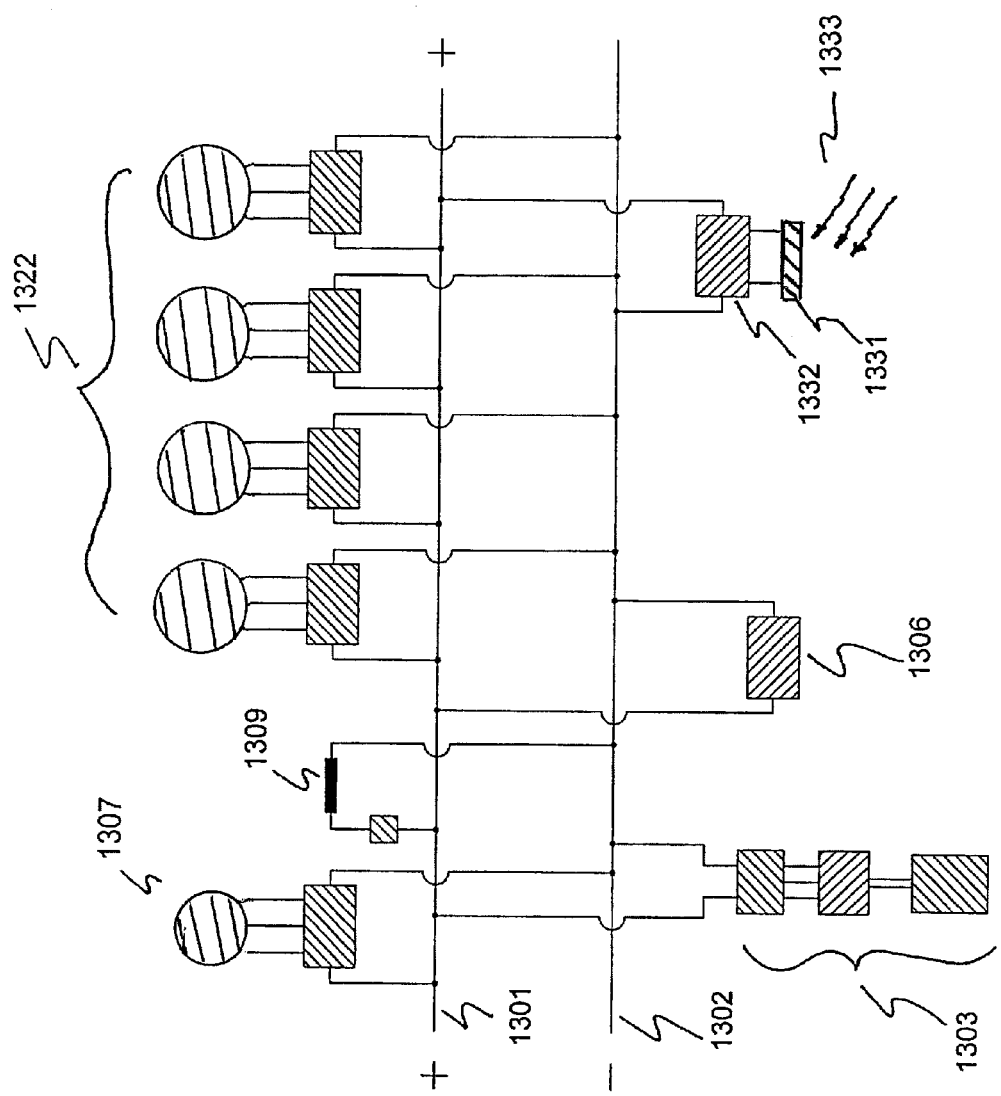
FIG. 13 is a block schematic of the elements of a hybrid crane power system with an engine and a solar power source.

FIG. 13 is a block schematic of the elements of a hybrid crane power system with an engine and a solar power source. This power system is similar to that of FIG. 8 and FIG. 12 except it shows an auxiliary solar prime power system to augment the power to the system when solar power 1333 is available. The solar system is comprised, for example, of solar panels 1331 and a power matching circuit 1332. The solar system is shown connected to the DC bus in parallel with an engine system 1303 and an energy storage system 1306. The solar system can be used to provide energy to the gantry motors 1322 or to charge the energy storage system 1306. This application is particularly useful as RTG cranes offer wide surfaces exposed to sunlight that can be equipped with solar panels.

A number of variations and modifications of the invention can be used. As will be appreciated, it would be possible to provide for some features of the invention without providing others. For example, in any combination of prime power, auxiliary prime power and energy storage systems can be employed on any of an RTG crane, an overhead crane or an elevator system. In the latter case, the power systems can be installed on the roof near the elevator shaft.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure.

It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A load-lifting apparatus comprising:
   i) at least one motor for driving a mechanical load-lifting device having a load-lifting average power and a load-lifting peak power;
   ii) at least one energy storage unit for storing electric energy and supplying said electric energy to the at least one motor, having an energy storage capacity and an energy storage unit output power;
   iii) at least one prime power system having a prime power system rated power, being electrically connected to the at least one energy storage unit and the at least one motor for selectively providing electrical energy to the at least one energy storage unit and—to the at least one motor;
   iv) a bus electrically connecting the at least one energy storage unit, the at least one prime power system and the at least one motor; and
   v) a control system for controlling the operation of the at least one prime power system and the load-lifting apparatus, and for monitoring the at least one energy storage unit,
   wherein the at least one motor selectively receives operational energy from the at least one energy storage unit and the at least one prime power system, the at least one motor supplies regenerative braking energy to the bus when the load-lifting device lowers a load, and wherein the ratio of the at least one prime power system rated power to the load-lifting peak power is between 0.2 and 0.7.

2. The-load-lifting apparatus of claim 1 wherein the electrical bus returns the regenerative braking energy to the at least one energy storage unit to increase the stored energy when the load-lifting device lowers a load.

3. The load-lifting apparatus of claim 1 wherein the electrical bus returns the regenerative braking energy to the at least one prime power system when the load-lifting device lowers a load.

4. The load-lifting apparatus of claim 1 wherein the electrical bus returns the regenerative braking energy to the at least one energy storage unit to increase the stored energy and to the at least one prime power system when the load-lifting device lowers a load.

5. The-load-lifting apparatus of claim 1 wherein the energy storage capacity is between 100 and 5,000 kW hours and the energy storage unit output power is between 50 and 2,500 kW.

6. The-load-lifting apparatus of claim 1 wherein the at least one prime power system rated power is between 50 and 5,000 kW.

7. The-load-lifting apparatus of claim 1 wherein the at least one prime power system comprises a prime power source selected from the group consisting of engines, diesel engines, gas turbine engines, microturbines, Stirling engines, spark ignition engines, fuel cells, solar cells, AC electrical networks, power induction systems, wind turbines and a combination thereof.

8. The load-lifting apparatus of claim 1 wherein the energy storage unit comprises an energy storage system selected from the group consisting of a battery pack, a bank of capacitors, a compressed air storage system, one or more flywheels and a combination thereof.

9. The-load-lifting apparatus of claim 1 wherein the energy storage unit forms part of a counterweight in the load-lifting apparatus.

10. The load-lifting apparatus of claim 1 wherein the load-lifting device is selected from the group consisting of cranes, rubber-tired gantry cranes, overhead cranes, mobile cranes, ship-to-shore cranes, container cranes, rail-mounted gantry cranes, straddle carrier cranes and elevators.

11. The load-lifting apparatus of claim 1 further comprising a power-dissipating load for dissipating excess regenerative braking energy on the electrical bus.

12. The load-lifting apparatus of claim 1 further comprising an auxiliary power system connected to the electrical bus.

13. The-load-lifting apparatus of claim 1 wherein the control system comprises a controller selected from the group consisting of analog devices, programmable logic controllers and computers.

14. The load-lifting apparatus of claim 1 wherein the load-lifting device is a rubber-tired gantry crane comprising legs and the at least one prime power system is mounted between a pair of said legs proximate a bottom end of said legs.

15. The load-lifting apparatus of claim 1 wherein the load-lifting device is a rubber-tired gantry crane comprising legs and the at least one energy storage unit is mounted between a pair of said legs proximate a bottom end of said legs.

16. The load-lifting apparatus of claim 1 wherein the load-lifting device is a rubber-tired gantry crane comprising legs, the at least one energy storage unit is mounted between a first pair of said legs proximate a bottom end of said first pair of legs on a first side of the gantry crane and the at least one prime power system is mounted between a second pair of said legs proximate a bottom end of said second pair of legs on an opposite side of the gantry crane.

17. The-load-lifting apparatus of claim 1, wherein the at least one energy storage unit and the at least one prime power system are sized and provided in a form adapted to retrofit with an existing receiving means on the load-lifting device for receiving a diesel engine and a generator set.

18. The load-lifting apparatus of claim 1 wherein the at least one motor is selected from the group consisting of variable frequency drive motors, AC drive motors, and DC drive motors.

19. The load-lifting apparatus of claim 1 wherein the at least one energy storage unit provides power regulation to the at least one prime power system.

20. A method of storing energy in a load-lifting apparatus comprising the steps of:
   a) providing a load-lifting apparatus comprising:
      i) at least one motor for driving a mechanical load-lifting device having a load-lifting average power and a load-lifting peak power;
      ii) at least one energy storage unit for storing electric energy and supplying said electric energy to said at least one motor, having an energy storage capacity and an energy storage unit output power;
      iii) at least one prime power system having a prime power system rated power, being electrically connected to the at least one energy storage unit and the at least one motor for selectively providing electrical energy to the at least one energy storage unit and to the at least one motor;
      iv) a bus electrically connecting the at least one energy storage unit, the at least one prime power system and the at least one motor; and
      v) a control system for controlling the operation of the at least one prime power system and the load-lifting apparatus, and for monitoring the at least one energy storage unit,
   b) selectively providing to the at least one motor operational energy from the at least one energy storage unit and the at least one prime power system; and
   c) supplying regenerative braking energy from the at least one motor to the electrical bus when the load-lifting device lowers a load,
   wherein the ratio of the at least one prime power system rated power to the load-lifting peak power is between 0.2 and 0.7.

* * * * *